United States Patent
Roberts

(10) Patent No.: US 12,443,695 B2
(45) Date of Patent: Oct. 14, 2025

(54) DATA VALUE ROUTING SYSTEM AND METHOD

(71) Applicant: Visa International Service Association, San Francisco, CA (US)

(72) Inventor: Nick Roberts, Littleton, CO (US)

(73) Assignee: Visa International Service Association, San Francisco, CA (US)

(*) Notice: Subject to any disclaimer, the term of this patent is extended or adjusted under 35 U.S.C. 154(b) by 104 days.

(21) Appl. No.: 18/470,149

(22) Filed: Sep. 19, 2023

(65) Prior Publication Data

US 2024/0004965 A1    Jan. 4, 2024

Related U.S. Application Data

(60) Division of application No. 17/470,907, filed on Sep. 9, 2021, now Pat. No. 11,797,650, which is a
(Continued)

(51) Int. Cl.
*H04L 29/06*      (2006.01)
*G06F 21/10*      (2013.01)
(Continued)

(52) U.S. Cl.
CPC .............. *G06F 21/44* (2013.01); *G06F 21/10* (2013.01); *G06F 21/78* (2013.01); *H04L 67/147* (2013.01)

(58) Field of Classification Search
CPC ........................................................ G06F 21/10
See application file for complete search history.

(56) References Cited

U.S. PATENT DOCUMENTS

| 11,144,617 B2 | 10/2021 | Roberts |
| 2009/0112721 A1 | 4/2009 | Hammad et al. |

(Continued)

FOREIGN PATENT DOCUMENTS

| CN | 107918738 A | 4/2018 |
| WO | 2011130422 A2 | 10/2011 |
| WO | 2018164684 A1 | 9/2018 |

OTHER PUBLICATIONS

U.S. Appl. No. 16/285,554, "Non-Final Office Action", Feb. 26, 2021, 10 pages.
(Continued)

*Primary Examiner* — Jason K Gee
(74) *Attorney, Agent, or Firm* — Kilpatrick Townsend & Stockton LLP

(57) ABSTRACT

A disclosed method includes a data distribution computer receiving a data packet comprising a plurality of data values in response to an interaction between a resource provider and a user. The data distribution computer can then determine a data item for each data value of the plurality of data values and associate each data value to a processing computer using the data item for each data value. It can generate a plurality of authorization request messages comprising at least one data value. It can then transmit the plurality of authorization request messages to a plurality of processing computers adapted to process the data values in the respective authorization request messages, where the plurality of processing computers process the data values in the respective authorization request messages. The plurality of authorization request messages are subsequently forwarded to the authorization computer. The authorization computer then analyzes each authorization request message.

19 Claims, 8 Drawing Sheets

Related U.S. Application Data continuation of application No. 16/285,554, filed on Feb. 26, 2019, now Pat. No. 11,144,617.

(51) Int. Cl.
*G06F 21/44* (2013.01)
*G06F 21/78* (2013.01)
*H04L 67/147* (2022.01)

(56) References Cited

U.S. PATENT DOCUMENTS

| | | |
|---|---|---|
| 2009/0119170 A1 | 5/2009 | Hammad et al. |
| 2010/0299249 A1 | 11/2010 | Carlson et al. |
| 2015/0186889 A1* | 7/2015 | Hogg .................. G07G 1/12 705/71 |
| 2016/0277380 A1* | 9/2016 | Wagner ............... H04W 12/069 |

OTHER PUBLICATIONS

U.S. Appl. No. 16/285,554 , "Notice of Allowance", Jun. 10, 2021, 8 pages.
U.S. Appl. No. 17/470,907 , "Non-Final Office Action", Mar. 7, 2023, 10 pages.
U.S. Appl. No. 17/470,907 , "Notice of Allowance", Jun. 22, 2023, 7 pages.
EP20159388.6 , "Extended European Search Report", Jul. 23, 2020, 7 pages.
EP20159388.6 , "Office Action", Feb. 15, 2022, 5 pages.
CN202010112565.4, "Office Action", Apr. 2, 2025, 17 pages.
EP20159388.6 , "Office Action", Feb. 17, 2025, 5 pages.

* cited by examiner

DATA VALUE ROUTING SYSTEM AND METHOD

CROSS-REFERENCES TO RELATED APPLICATIONS

This application is a Divisional Application of U.S. application Ser. No. 17/470,907, filed on Sep. 9, 2021, which is a Continuation Application of U.S. patent application Ser. No. 16/285,554, filed on Feb. 26, 2019, now U.S. Pat. No. 11,144,617, which are herein incorporated by reference in their entirety for all purposes.

BACKGROUND

A processing computer that processes data can cause bottlenecks in a data flow of a processing system. The processing computer can process every data value received in a data packet. For example, the processing computer can receive a data packet including a biometric template as well as other data values. As the processing computer evaluates the biometric template, the other data values are merely being held in memory until the processing computer evaluates the biometric template, thus causing inefficiencies.

Additionally, there are security risks associated with sending the data packet including all of the data values to the processing computer. A malicious entity that compromises the processing computer and/or a communication channel to the processing computer can access all of the data values in the data packet. This can be problematic, for example, when the data values relate to user authentication data, such as biometrics and passwords.

Embodiments of the invention address this problem and other problems individually and collectively.

SUMMARY

Embodiments of the invention are related to methods and systems for splitting data packets into a plurality of data values and generating a plurality of authorization request messages comprising at least one data value.

One embodiment is related to a method comprising: receiving, by a data distribution computer, a data packet comprising a plurality of data values in response to an interaction between a resource provider and a user; determining, by the data distribution computer, a data item for each data value of the plurality of data values; associating, by the data distribution computer, each data value to a processing computer using the data item for each data value; generating, by the data distribution computer, a plurality of authorization request messages comprising at least one data value; and transmitting, by the data distribution computer, the plurality of authorization request messages to a plurality of processing computers adapted to process the data values in the respective authorization request messages, wherein the plurality of processing computers process the data values in the respective authorization request messages, wherein the plurality of authorization request messages are subsequently forwarded to the authorization computer, wherein the authorization computer analyzes each authorization request message to authorize or decline the interaction.

Another embodiment is related to a data distribution computer comprising: a processor; a memory device; and a computer-readable medium coupled to the processor, the computer-readable medium comprising code executable by the processor for implementing a method comprising: receiving a data packet comprising a plurality of data values in response to an interaction between a resource provider and a user; determining a data item for each data value of the plurality of data values; associating each data value to a processing computer using the data item for each data value; generating a plurality of authorization request messages comprising at least one data value; and transmitting the plurality of authorization request messages to a plurality of processing computers adapted to process the data values in the respective authorization request messages, wherein the plurality of processing computers process the data values in the respective authorization request messages, wherein the plurality of authorization request messages are subsequently forwarded to the authorization computer, wherein the authorization computer analyzes each authorization request message to authorize or decline the interaction.

Further details regarding embodiments of the invention can be found in the Detailed Description and the Figures.

DETAILED DESCRIPTION

Figure 1:
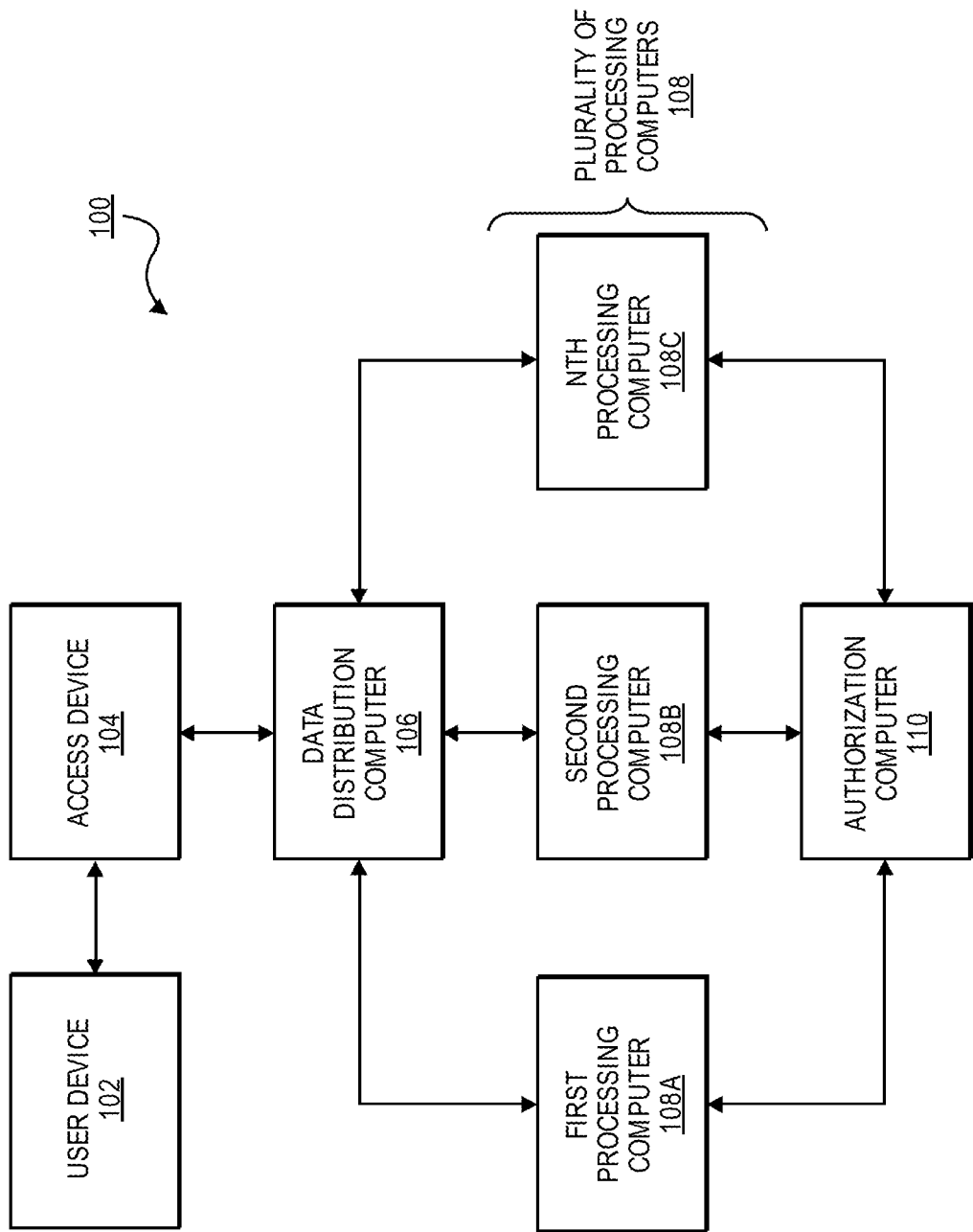
FIG. 1 shows a block diagram of a system illustrating a data processing system according to embodiments of the invention.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

"Credentials" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 (card verification value 3), etc. An example of a PAN is a 16-digit number, such as "4147 0900 0000 1234." In some embodiments, credentials may be considered sensitive information.

An "interaction" may include a reciprocal action or influence. An interaction can include a communication, contact, or exchange between parties, devices, and/or entities. Example interactions include a transaction between two parties and a data exchange between two devices.

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, and the like. In some embodiments, an access device can be a device that acts as a payment terminal at a resource provider location. For example, in some embodiments, where an access device may comprise a POS terminal, any suitable POS terminal may be used and may include a reader, a processor, and a computer-readable medium.

An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with user devices.

A "data packet" may include one or more units of data made into a package. A data packet can comprise one or more data values. For example, a user device may receive data values from a user and then generate a data packet comprising the data values. The user device can then transmit the data packet to an access device. In some embodiments, a data packet may further comprise a data header.

A "data value" may include a unit of data. A data value may be associated with a data item. A data value may include data associated with an interaction between a user and a resource provider computer. For example, a data value can be "415-123-4567" which can correspond to a data item of "phone number." A data value can be associated with any of the data items described herein. As another example, a data value can be "Jane Doe" which can correspond to a data item of "name." In some embodiments, a data value can be encrypted.

A "data item" may include a particular kind of data value. A data item of a data value can be defined by the values the data value can take, the programming language used, or the operations that can be performed on the data item. For example, a data item can be a biometric template, a name, user credentials (e.g., a username, a password, etc.), a security code, a location access code, a phone number, product data, a physical address, a location, an IP address, an email address, a user identifier, a device identifier, etc. In some embodiments, the product data can be stock keeping unit (SKU) data including a transaction amount, a date, a tax amount, a customer code, a merchant postal code, a tax identification code, a merchant minority code, a merchant state code, a ship from postal code, destination postal code, an invoice number, an order number, an item product code, an item commodity code, an item description, an item quantity, an item unit of measure, an item extended amount, a freight amount, a duty amount, and/or the like.

For example, a data packet can include four data values. The four data values can correspond to four data items of a "biometric template," a "phone number," a "username," and a "password." The four data values can be "LW92J349VNM186FD . . . " for the biometric template, "415-123-4567" for the phone number, "JohnDoe123" for the username, and "123456789" for the password.

As another example, a data packet can include three data values. The three data values can correspond to three data items of a "grocery SKU," a "grocery SKU," and a "electronics SKU," where two of the data values may correspond to the same data item The three data values can be "APPL04," "ORNG01," and "TV02," which represent products of an apple, an orange, and a television, respectively. The product data may include subfields and/or associated data including a transaction amount. For example, the three data values of "APPL04," "ORNG01," and "TV02," can be associated with transaction amounts of "$1.23," "$0.86," and "$799," respectively.

A "data header" may include supplemental data placed in a data packet or message (e.g., authorization response message, authorization request message, etc.). In some embodiments, the data header can include supplemental data related to an interaction between a user and a resource provider. A data header can include any suitable information, such as, but not limited to, a sender and/or receiver address (e.g., IP address(es)), an amount, a protocol governing the format of the message, cryptographic information (e.g., a digital signature, etc.), and/or the like.

"Access data" may include any suitable data that can be used to access a resource or create data that can access a resource. In some embodiments, access data may be account information for a payment account. Account information may include a PAN, payment token, expiration date, card verification values (e.g., CVV, CVV2), dynamic card verification values (dCVV, dCVV2), etc. In other embodiments, access data could include data that can be used to access a location or to access secure data. Such information may be ticket information for an event, data to access a building, transit ticket information, passwords, biometrics or other credentials to access secure data, etc.

In some embodiments, a data value may include product data. "Product data" may include data associated with one or more resources involved in an interaction. Product data can include, but is not limited to, a transaction amount, a date, a tax amount, a customer code, a merchant postal code, a tax identification code, a merchant minority code, a merchant state code, a ship from postal code, destination postal code, an invoice number, an order number, an item product code, an item commodity code, an item description, an item quantity, an item unit of measure, an item extended amount, a freight amount, a duty amount, and the like. Product data can include any suitable product data. For example, a data item may be "grocery product data," "electronics product data," "fitness product data," "home improvement product data," and any other suitable product data.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "processing computer" may include a computer or a network of computers that can process data. A processing computer may receive a data packet comprising a number of data values and may process the data values. The processing computer can forward the data packet to an authorization computer. In some embodiments, the processing computer can output results of the processing and include the results in a message with the data packet to the authorization computer.

A "network computer" may include a computer or a network of computers that can process interaction(s). In some embodiments, a network computer can be in an electronic system used to accept, transmit, or process interactions made by user devices for resource, goods, services or access to locations or data. A network computer may transfer information and/or funds among issuers, acquirers, transacting parties, and/or users. An example of the network computer may include a processing server computer such as VisaNet™, operated by Visa®.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the invention allow for a data distribution computer to receive a data packet comprising a plurality of data values during an interaction between a user and a resource provider. The data distribution computer can determine data items associated with each of the data values and then determine to send each data value to a processing computer dependent on the capabilities of the processing computer. Upon receiving the data value(s), each of the processing computers can process the data value(s) in parallel to one another and then transmit the data value(s) to an authorization computer. The authorization computer can then determine whether or not to authorize the interaction between the user and the resource provider.

FIG. 1 shows a block diagram of a system 100 comprising a number of components according to some embodiments of the invention. The system 100 comprises a user device 102, an access device 104, a data distribution computer 106, a plurality of processing computers 108 including a first processing computer 108A, a second processing computer 108B, and an nth processing computer 108C, as well as an authorization computer 110.

The user device 102 can be in operative communication with the access device 104. The access device 104 can be in operative communication with the data distribution computer 106 which can be in operative communication with the plurality of processing computers 108 including the first processing computer 108A, the second processing computer 108B, and the nth processing computer 108C. The data distribution computer 106 can be in operative communication with any suitable number of processing computers. Each processing computer of the plurality of processing computers 108 can be in operative communication with the authorization computer 110.

For simplicity of illustration, a certain number of components are shown in FIG. 1. It is understood, however, that embodiments may include more than one of each component. In addition, some embodiments of the invention may include fewer than or greater than all of the components shown in FIG. 1. For example, the system 100 may include 2, 5, 9, 15, 25, etc. processing computers. As another example, there may be any suitable number of authorization computers (e.g., 1, 2, 4, 10, 20, etc.).

Messages between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The user device 102 may include any suitable device, such as a mobile phone, a smart phone, a card, a PDA, a laptop computer, a desktop computer, etc. The user device 102 may be configured to receive data values from the user. For example, the user device 102 may capture data from the user via touch screens, biometric scanners, keyboards, and/or any other suitable input element(s). The user device 102 may also be configured to store the received data values which may be used during subsequent interactions.

In some embodiments, a user may conduct an interaction at a resource provider location (e.g., a merchant location) using the user device 102. The interaction may be an authentication interaction, a payment transaction (e.g., for the purchase of a good or service), an access interaction (e.g., for access to a transit system), and/or any other suitable interaction. The user device 102 can interact with the access device 104 at the resource provider location. For example, the user may tap the user device 102 against a near-field communication (NFC) reader in the access device 104. Alternately, the user may indicate a data packet to a resource provider computer (not shown), associated with the access device 104, electronically, such as in an online interaction. In some cases, the user device 102 may transmit, to the access device 104, an account identifier, such as a payment token.

The access device 104 can receive the data packet from the user device 102 via an NFC reader, or other suitable input element, as described herein. The access device 104 can then transmit the data packet to the data distribution computer 106. In some embodiments, the access device 104 can transmit the data packet to a resource provider computer, wherein the resource provider computer can then forward the data packet to the data distribution computer 106. The data packet may include any suitable data values associated with the interaction. For example, the data values may include biometric templates, user credentials (e.g., username, password, etc.), a phone number, product data, a physical address, etc. In some embodiments, the product data can include SKU data, for example, a transaction amount, a date, a tax amount, a customer code, a merchant postal code, a tax identification code, a merchant minority code, a merchant state code, a ship from postal code, destination postal code, an invoice number, an order number, an item product code, an item commodity code, an item description, an item quantity, an item unit of measure, an item extended amount, a freight amount, a duty amount, and/or the like.

In some embodiments, the resource provider computer may operate a host site. The host site may be a website and may be accessible by a browser on the user device 102. The host site may be a location connected to the Internet that maintains one or more pages on the World Wide Web. In other embodiments, the resource provider computer may receive the data packet from the access device 104.

In order to authorize the interaction, the access device 104 or the resource provider computer can transmit the data packet to the data distribution computer 106. In some embodiments, the access device 104 or the resource provider computer can generate an authorization request message and then transmit the authorization request message to the data distribution computer 106. The authorization request message may comprise the data packet.

The data distribution computer 106 may be configured to distribute data among the plurality of processing computers 108. After receiving the data packet, the data distribution computer 106 can be configured to determine a data item for each data value included in the data packet. The data distribution computer 106 may also be configured to associate each data value to a processing computer of the plurality of processing computers 108 using the data item for each data value. For example, the data distribution computer can store a table that indicates the data items a particular processing computer is adapted to receive.

The data distribution computer 106 can also generate a plurality of authorization request messages comprising at least one data value. In some embodiments, each authorization request message can further comprise a data header. For example, the data header can include an IP address, or other way of identifying the data distribution computer 106 (e.g., device identifier, etc.), as well as a total (i.e., amount) associated with the data value(s).

The data distribution computer 106 can then transmit the plurality of authorization request messages to the plurality of processing computers 108. For example, the data distribution computer 106 can transmit a first authorization request message to the first processing computer 108A, a second authorization request message to the second processing computer 108B, and an Nth authorization request message to the Nth processing computer 108C.

In some embodiments, the data distribution computer 106 may be a transport computer. The transport computer be located between (in an operational sense) the resource provider computer and the plurality of processing computers 108. The transport computer may be operated by an entity such as an acquirer. An acquirer can maintain an account of any merchants (e.g., an airline) with which users may wish to interact.

A processing computer of the plurality of processing computers 108 (e.g., the first processing computer 108A, the second processing computer 108B, the Nth processing computer 108C, etc.) can route or switch messages between a number of data distribution computers including the data distribution computer 106, and a number of authorization computers including the authorization computer 110. A processing computer may be a network computer in some embodiments. The network computer may be configured to provide authorization services, and clearing and settlement services for payment interactions. A network computer may include data processing subsystems, networks, and operations used to support and deliver authorization services, exception file services, and clearing and settlement services. An exemplary network computer may include VisaNet™. Network computers such as VisaNet™ are able to process credit card interactions, debit card interactions, and other types of commercial interactions. VisaNet™, in particular includes a Visa Integrated Payments (VIP) system which processes authorization requests and a Base II system which performs clearing and settlement services. Furthermore, the processing computer may include a server computer and may use any suitable wired or wireless telecommunications network, including the Internet. In some embodiments, the network computer may forward an authorization request received from the data distribution computer 106 to the authorization computer 110 via a communication channel. The network computer may further forward an authorization response message received from the authorization computer 110 to the data distribution computer 106. In some embodiments, network computers can include authentication processing computers.

Each processing computer of the plurality of processing computers 108 can then forward the authorization request message to the corresponding authorization computer 110 associated with an authorizing entity associated with the user's account(s).

The authorization computer 110 may be configured to authorize any suitable request, including access to data, access to a location, or approval for a payment. In some embodiments, the authorization computer 110 may be operated by an account issuer. Typically, the issuer is an entity (e.g., a bank) that issues and maintains an account of a user. The account may be a credit, debit, prepaid, or any other type of account.

After the authorization computer 110 receives the plurality of authorization request messages, the authorization computer 110 can transmit a plurality of authorization response messages back to the respective processing computers of the plurality of processing computers 108 to indicate whether the current interaction is authorized (or not authorized). Each of the processing computers can then forward the plurality of authorization response messages to the data distribution computer 106. In some embodiments, each processing computer may decline the interaction even if the authorization computer 110 has authorized the interaction, for example depending on a value of a fraud risk score. In other embodiments, the authorization computer 110 may transmit the plurality of authorization response messages directly to the data distribution computer 106. After receiving the plurality of authorization response messages, the data distribution computer 106 can then transmit the plurality of authorization response messages to the access device 104. In some embodiments, the data distribution computer 106 can transmit the authorization response messages to the resource provider computer.

After the resource provider computer receives the plurality of authorization response messages, the resource provider computer may then provide an indication of whether the interaction was authorized to the user device 102 and/or the access device 104. The indication may be displayed by the access device 104, or may be printed out on a physical receipt. Alternately, if the interaction is an online interaction, the resource provider may provide a web page or other indication of the authorization response messages as a virtual receipt to the user.

In some embodiments, at the end of the day (or other suitable length of time), a clearing and settlement process can be conducted by the plurality of processing computers. A clearing process is a process of exchanging financial details between an acquirer and an authorizing entity to facilitate posting to a user's account and reconciliation of the user's settlement position.

Figure 2:
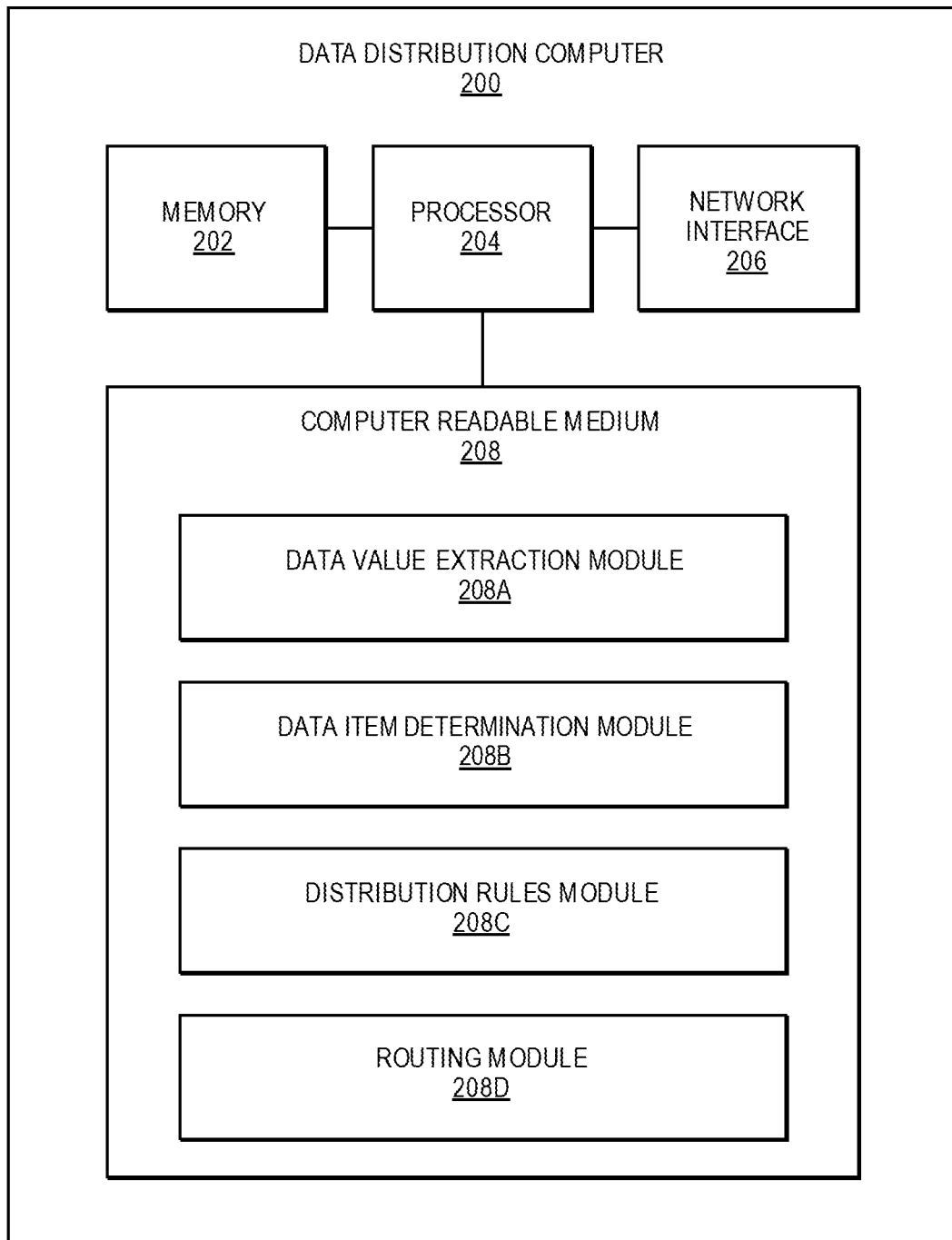
FIG. 2 shows a block diagram illustrating a data distribution computer according to embodiments of the invention.

FIG. 2 shows a block diagram of an data distribution computer 200 according to some embodiments of the invention. The exemplary data distribution computer 200 may comprise a processor 204. The processor 204 may be coupled to a memory 202, a network interface 206, and the computer readable medium 208 comprising a data value extraction module 208A, a data item determination module 208B, a distribution rules module 208C, and a routing module 208D.

The memory 202 may be any suitable memory capable of storing data, information, and/or code. The memory 202 may store cryptographic keys, key identifiers, routing tables, and any other relevant data securely. The memory 202 may be in the form of a secure element, a hardware security module, or any other suitable form of secure data storage.

The network interface 206 may include an interface that can allow the data distribution computer 200 to communicate with external computers. The network interface 206 may enable the data distribution computer 200 to communicate data to and from another device (e.g., resource provider computer, authorization computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 208 may comprise code, executable by the processor 204, to implement a method comprising: receiving a data packet comprising a plurality of data values in response to an interaction between a resource provider and a user; determining a data item for each data value of the plurality of data values; associating each data value to a processing computer using the data item for each data value; generating a plurality of authorization request messages comprising at least one data value; and transmitting the plurality of authorization request messages to a plurality of processing computers adapted to process the data values in the respective authorization request messages, wherein the plurality of processing computers process the data values in the respective authorization request messages, wherein the plurality of authorization request messages are subsequently forwarded to the authorization computer, wherein the authorization computer analyzes each authorization request message to authorize or decline the interaction.

The data value extraction module 208A, in conjunction with the processor 204, can extract a plurality of data values from a data packet. The data value extraction module 208A can extract any suitable number of data values from a data packet (e.g., 2, 5, 20, 50, etc. data values). In some embodiments, the data value extraction module 208A can extract the data values by parsing the data packet into sections based on delimiters. The data values may be extracted using any suitable method known to one of skill in the art.

The data item determination module 208B, in conjunction with the processor 204, can determine a data item of a data value. For example, the data item determination module 208B can determine that a data value is of a data item of fingerprint biometric template. The data item determination module 208B can determine the data item by evaluating characteristics of the data value. For example, the data item determination module 208B can evaluate the length and/or size of the data value (e.g., 8 characters, 15 MB, etc.), a primitive type of the data value (e.g., Boolean, integer, character, double, etc.), and/or value(s) and/or contents of the data value.

In some embodiments, the data item determination module 208B may also be configured to determine the data item based on which access device the data packet was received from, as some access devices may include certain data items at certain frequencies. For example, the data distribution computer 200 may receive a data item of email address in 87% of data packets received from a particular access device. Additionally, the data item determination module 208B can determine the type of a data value based on the other data values included in the data packet. For example, a data packet that includes a data value of data item of username typically also includes a data value of data item of password.

In some embodiments, the plurality of data values in the data packet may be labeled with the data item of each data value. The data item determination module 208B can determine the data item based on the label. For example, the access device or the user device can label the data values in the data packet prior to transmitting the data packet to the data distribution computer 200. In some embodiments, the label of the data item may be included in the data header of the data packet.

In some embodiments, the data item determination module 208B, in conjunction with the processor 204, can determine a data item of a data value using a lookup table. The data distribution computer 200 can store a lookup table including data values and the associated data items. For example, the lookup table can include data values such as "APPL04," "ORNG01," and "TV02," which can be associated with the data items of "grocery SKU," "grocery SKU," and "electronics SKU," respectively.

The distribution rules module 208C, in conjunction with the processor 204, can determine a processing computer of a plurality of processing computers to transmit an authorization request message to. The distribution rules module 208C can associate each data value to a processing computer of the plurality of processing computers using the data item for each data value, as determined by the data item determination module 208B. For example, in some embodiments, the data distribution computer 200 can store a table that indicates the data items a particular processing computer is adapted to receive. The table can comprise a list of processing computers including the IP address of each processing computer. Each processing computer of the list of processing computers can be associated with one or more data items that the processing computer is adapted to process.

For example, a first processing computer may have an IP address (e.g., 172.16.254.1 in Internet protocol version 4 (IPv4) or 2001:db8:0:1234:0:567:8:1 in Internet protocol version 6 (IPv6), etc.) and may be adapted to process data value(s) of the data item "biometric template." Additionally, a second processing computer may have an IP address (e.g., 123.45.678.9 in IPv4) and may be adapted to process data value(s) of the data items "name," "email address," "physical address," and "data of birth."

The distribution rules module 208C can determine that a data value of the data item "biometric template" can be transmitted to the first processing computer, while the data values of the data items "name" and "email address" can be transmitted to the second processing computer.

As another example, a first processing computer may be adapted to process data value(s) of the data item "grocery SKU," whereas a second processing computer may be adapted to process data value(s) of the data item "electronics SKU." The distribution rules module 208C can determine that data values of the data item "grocery SKU" can be transmitted to the first processing computer, while the data value of the data item "electronics SKU" can be transmitted to the second processing computer.

The routing module 208D, in conjunction with the processor 204, can generate and transmit a plurality of authorization request messages comprising at least one data value to the plurality of processing computers. The routing module 208D can transmit the plurality of authorization request messages over any suitable communication channel(s) described herein.

Figure 3:
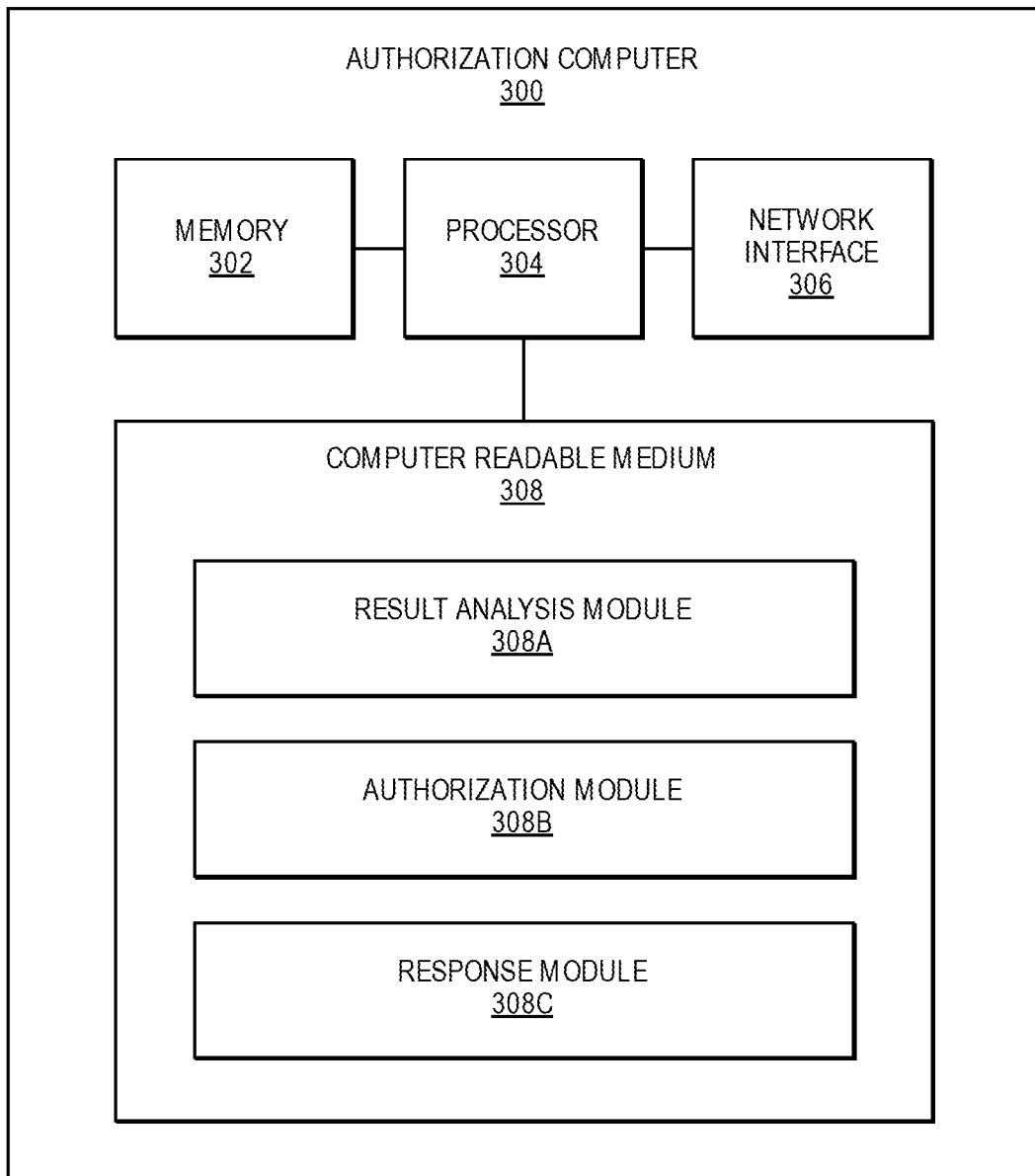
FIG. 3 shows a block diagram illustrating an authorization computer according to embodiments of the invention.

FIG. 3 shows a block diagram of an authorization computer 300 according to some embodiments of the invention. The exemplary authorization computer 300 may comprise a processor 304. The processor 304 may be coupled to a memory 302, a network interface 306, and a computer readable medium 308 comprising a result analysis module 308A, an authorization module 308B, and a response module 308C.

The memory 302 may be similar to the memory 202 and will not be repeated here. The network interface 306 may be similar to the network interface 206 and will not be repeated here. The computer readable medium 308 may comprise code, executable by the processor 304, for performing the functionality described herein.

In some embodiments, the authorization computer 300 can comprise the result analysis module 308A. The result analysis module 308A, in conjunction with the processor 304, can analyze one or more than one results received from one or more than one processing computers. The result analysis module 308A may, for instance, in conjunction with the processor 304, compare the information received via the plurality of authorization request messages with stored information at the authorization computer 300 and/or a suitable database (such as comprising verification values).

The authorization module 308B, in conjunction with the processor 304, can perform some or all the functionality associated with authorizing an interaction associated with a plurality of authorization request messages. The authorization request message may be associated with the interaction between the user and the resource provider. The plurality of authorization request messages may include any suitable information that may be used to authorize or identify the interaction.

In some embodiments, the authorization module 308B may determine whether or not to authorize the interaction based on the analysis of the result(s). For example, the result may indicate that the biometric template received from the user does not match a previously stored biometric template. The authorization module 308B may determine to not authorize the interaction since the biometric templates do not match.

As another example, the result may indicate that a data item of "electronics SKU" has triggered a fraud warning. For example, the data values associated with the "electronics SKU" data item may indicate a total amount of $15,000, which may indicate a high probability of fraud. The authorization module 308B, in conjunction with the processor 304, can determine to not authorize the interaction since there is a high probability of fraud. In other embodiments, the authorization module 308B can determine to authorize the interaction if there is a low probability of fraud.

The response module 308C, in conjunction with the processor 304, can generate authorization response messages. In some embodiments, the response module 308C can generate a plurality of authorization response messages corresponding to a received plurality of authorization request messages. An authorization response message can comprise an indication of whether or not the interaction between the user and the resource provider is authorized. In some embodiments, the authorization response message can further comprise data value(s) and/or a data header. The authorization computer 300 can be configured to transmit the plurality of authorization response messages to the plurality of processing computers or the data distribution computer over any suitable communication channel described herein.

Figure 4:
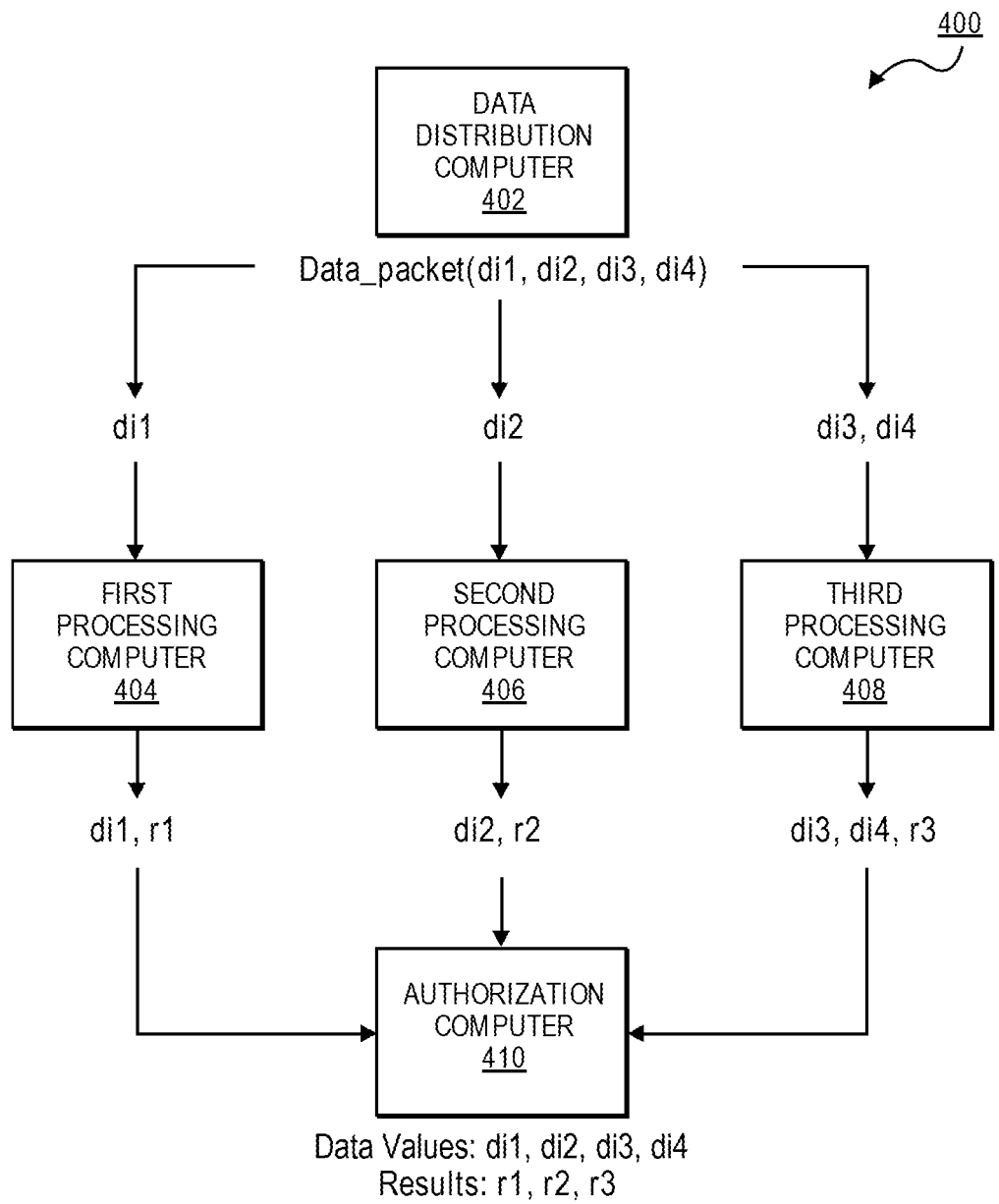
FIG. 4 shows a block diagram illustrating a method of distributing data values according to embodiments of the invention.

FIG. 4 shows a block diagram illustrating a method of distributing data values according to embodiments of the invention. A system 400 includes a data distribution computer 402, a first processing computer 404, a second processing computer 406, a third processing computer 408, and an authorization computer 410. For simplicity of illustration, a certain number of components are shown in FIG. 4. It is understood, however, that embodiments may include more than one of each component. In addition, some embodiments of the invention may include fewer than or greater than all of the components shown in FIG. 4.

The data distribution computer 402 can receive a data packet from any suitable computer (e.g., the access device 104 described in FIG. 1). The data packet can comprise a plurality of data values. For example, the data packet can comprise four data values including di1, di2, di3, and di4. However, it is understood that the data packet may comprise any suitable number of data values. In some embodiments, the data distribution computer 402 can receive the data packet in response to an interaction between a resource provider associated with the access device and a user of a user device.

The data distribution computer 402 can determine a data item for each data value of the plurality of data values. For example, the data distribution computer 402 can determine that di1 is of the data item fingerprint biometric template. The data distribution computer 402 can also determine that di2 is of the data item phone number, di3 is of the data item username, and di3 is of the data item password.

For example, the data distribution computer 402 can determine that di1 is of the data item fingerprint biometric template by evaluating characteristics of the data value such as the size of di1 (e.g., 9 to 6 kb, etc.). Additionally, the data distribution computer 402 can determine that di1 has a format of a common biometric exchange file format (CB-EFF). The data distribution computer 402 can determine that di2 is of the data item phone number since it is in a format of "xxx-xxx-xxxx." The data distribution computer 402 can further determine that di3 and di4 are of the data items username and password, respectively, by determining that the access device, that the data packet was received from, transmits usernames and passwords at a frequency of 95% when also transmitting a fingerprint biometric template. The data distribution computer 402 can further confirm the data items of di3 and di4 by evaluating the size of di3 and di4 (e.g., between 7 and 99 characters, etc.).

After determining a data item for each data value, the data distribution computer 402 can associate each data value to a processing computer using the data item of each data value. For example, the data distribution computer 402 can determine that di1 (the fingerprint biometric template) can be transmitted to the first processing computer 404 (e.g., a biometric analysis computer operatively coupled to a biometric template database). The data distribution computer 402 can also determine that di2 (the phone number) can be transmitted to the second processing computer 406 (e.g., a user phone authentication computer) and that di3 (the username) and di4 (the password) can be transmitted to the third processing computer 408 (e.g., a user account hosting server computer). The data distribution computer 402 can determine the processing computers in any suitable method described herein, for example, by associating the data item for each data value to a processing computer with a table.

The data distribution computer 402 can then generate a plurality of authorization request messages comprising at least one data value. For example, the data distribution computer 402 can generate three authorization request messages. A first authorization request message comprising di1, a second authorization request message comprising di2, and a third authorization request message comprising di3 and di4. After generating the plurality of authorization request messages, the data distribution computer 402 can transmit the plurality of authorization request messages to the plurality of processing computers adapted to process the data values in the respective authorization request messages. For example, the data distribution computer 402 can transmit the first authorization request message to the first processing computer 404, the second authorization request message to the second processing computer 406, and the third authorization request message to the third processing computer 408.

Upon receiving the plurality of authorization request message, each processing computer can process the data values in the respective authorization request messages. For example, the first processing computer 404 can compare the fingerprint biometric template to a plurality of stored biometric templates stored in a biometric template database.

The first processing computer 404 can process any suitable type of biometric template (e.g., fingerprint, iris, face, etc.). The first processing computer 404 can process the biometric template in any suitable manner, for example, as described in U.S. Pat. No. 9,847,997, filed Nov. 11, 2015 and entitled "Server Based Biometric Authentication," which is herein incorporated by reference. The first processing computer 404 can determine a result r1 which can indicate whether or not the biometric templates match. In some embodiments, r1 can include a match score.

Furthermore, the second processing computer 406, for example, can generate a code and can transmit the code to the phone associated with the received phone number. In some embodiments, the phone may be the user device. Upon receiving the code, the user can input the code into a webpage associated with the second processing computer 406. The second processing computer 406 can then determine whether or not the received code matches the transmitted code. If they match, then the second processing computer 406 can output a result r2, for example, "match."

The third processing computer 408 can compare user credentials including a username and password to user credentials stored in a user database. The third processing computer 408 can determine whether or not the received credentials match the stored credentials. The stored credentials can be stored in any suitable manner. For example, the stored credentials can be encrypted (e.g., via MD5, MD6, SHA-256, etc.) prior to being stored. In some embodiments, the third processing computer 408 can compare the encrypted received user credentials to the encrypted stored credentials. In yet other embodiments, the stored credentials can be salted prior to being hashed with a hash function. For example, a salt, which can be a random value, can be concatenated with the user credentials before inputting the user credentials into the hash function. The salt can be a static salt or a dynamic salt generated by a random string generator, as known to one of ordinary skill in the art. The salt value can be used to prevent replay attacks.

The third processing computer 408 can output a result (e.g., r3). The result determined by the third processing computer 408 can be an indication of whether or not the received username and password match a previously stored username and password. For example, r3 can be a "match" or a "no match."

After each processing computer processes the data value (s), each processing computer can respectively forward the plurality of authorization request messages to the authorization computer 410. In some embodiments, each of the processing computers can insert the result (determined by the respective processing computer) into the authorization request message. In other embodiments, the plurality of authorization request messages may not be altered by the plurality of processing computers. For example, the first processing computer 404 can forward the first authorization request message to the authorization computer 410. The second processing computer 406 and the third processing computer 408 can forward the second authorization request message and the third authorization request message, respectively, to the authorization computer 410.

The authorization computer 410 can receive the plurality of authorization request messages from the plurality of processing computers. For example, the authorization computer 410 can receive the first authorization request message comprising at least di1 from the first processing computer 404.

In some embodiments, the authorization computer 410 may receive each of the authorization request messages at different times based on the processing time of the processing computer. For example, the authorization computer 410 may receive the third authorization request message before the first authorization request message, as the third processing computer 408 may process di3 and di4 before the first processing computer 404 processes di1.

The authorization computer 410 can then analyze each authorization request message to authorize or decline the interaction between the resource provider and the user. For example, the authorization computer 410 can comprise a plurality of authorization rules that can be used to determine whether an authorization request is valid or not. An authorization rule can include a plurality of conditions that may be compared to the parameters of an authorization request. The authorization computer 410 may determine that an authorization request should be rejected (e.g., the user is denied access to a resource) if the parameters of the authorization request satisfy one or more conditions of one or more of the authorization rules. The authorization computer 410 can generate an authorization response message for each authorization request message. The authorization response message can include an outcome indication which can indicate whether the authorization request was rejected or accepted.

Figure 5:
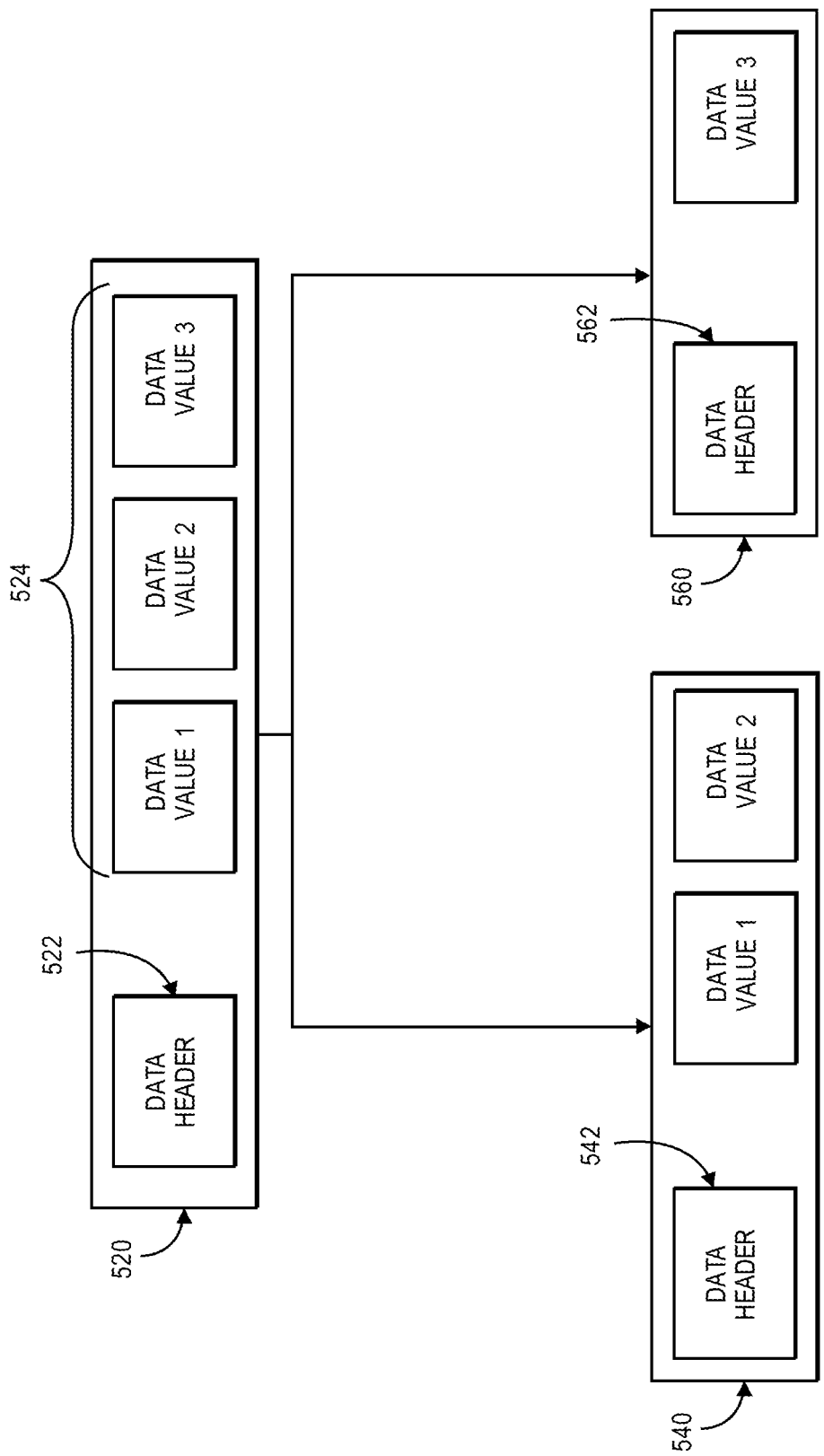
FIG. 5 shows a block diagram illustrating a method of splitting a data packet according to embodiments of the invention.

FIG. 5 shows a block diagram illustrating splitting a data packet according to embodiments of the invention. FIG. 5 includes a data packet 520, a first authorization request message 540 and a second authorization request message 560.

The data packet 520 can comprise a plurality of data values 524. The plurality of data values can include data value 1, data value 2, and data value 3. The data packet 520 can further comprise a data header 522.

A data distribution computer can receive the data packet 520 from an access device, or other suitable computer. The data distribution computer can store a table that associates data items to processing computers. For example, the data distribution computer can store the following table:

| Processing Computer | First Processing Computer | First Processing Computer | Second Processing Computer | Third Processing Computer |
|---|---|---|---|---|
| Data item | Data item 1 | Data item 2 | Data item 3 | Data item 4 |

The data distribution computer can determine that data value 1 corresponds to data item 1, data value 2 corresponds to data item 2, and data value 3 corresponds to data item 3. The data distribution computer can then associate data value 1 and data value 2 with a first processing computer and can then associate data value 3 with a second processing computer.

After determining the data items for each data value and associating each data value to a processing computer, as described herein, the data distribution computer can generate a plurality of authorization request messages comprising at least one data value. The data distribution computer, for example, can generate the first authorization request message 540 and the second authorization request message 560.

The first authorization request message 540 can comprise data value 1 and data value 2. In some embodiments, the first authorization request message can further comprise a data header 542. The data header 542 can comprise supplemental data (e.g., data regarding the interaction, device identifiers for routing, etc.). The second authorization request message 560 can comprise data value 3. In some embodiments, the second authorization request message 560 can further comprise a data header 562 which may be similar to the data header 542.

After the data distribution computer generates the plurality of authorization request messages, the data distribution computer can transmit the plurality of authorization request messages to the previously determined processing computer of the plurality of processing computers.

Figure 6:
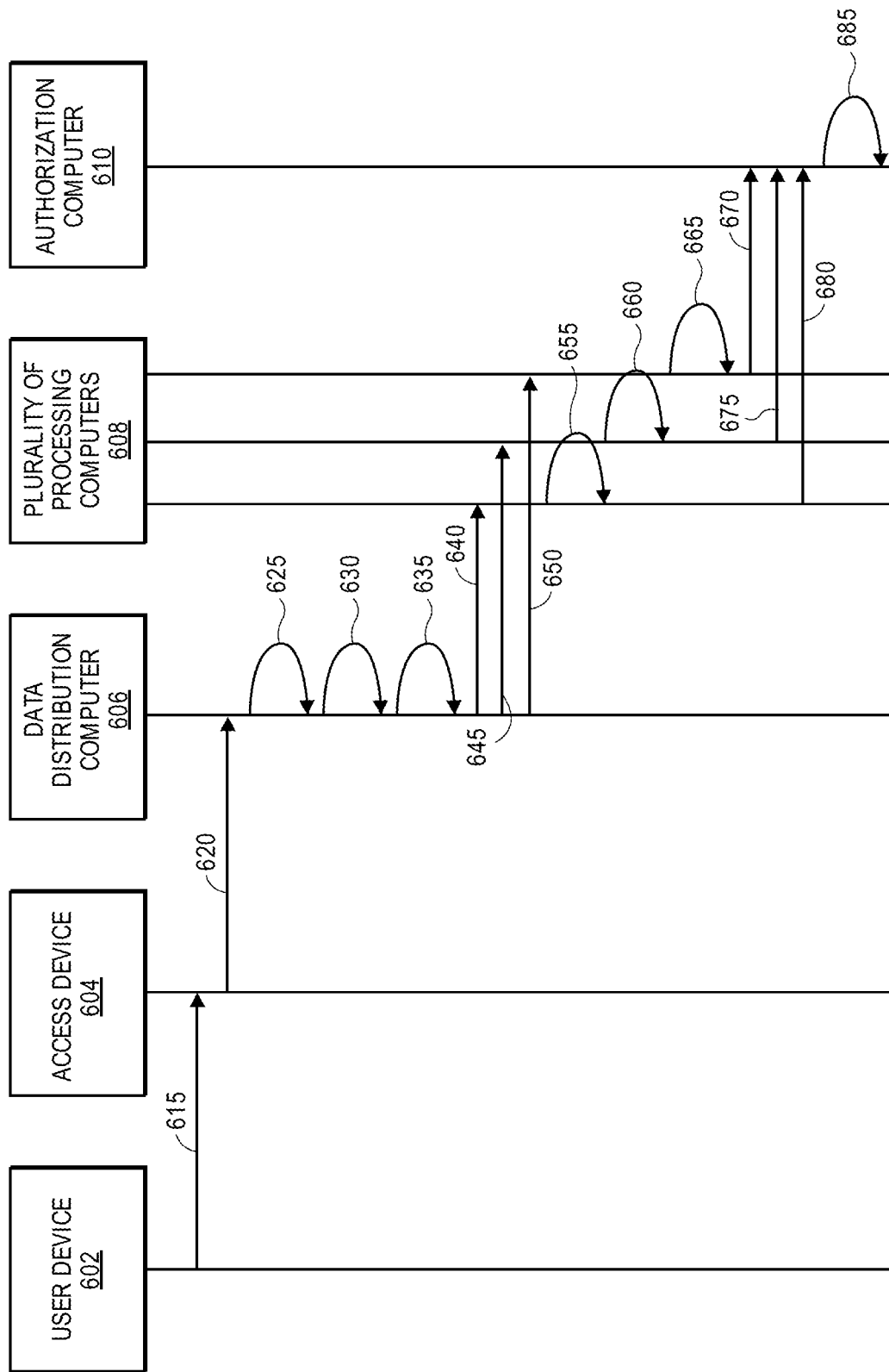
FIG. 6 shows a flowchart illustrating an authorization request message method according to embodiments of the invention.

FIG. 6 shows a flowchart of an interaction method according to an embodiment of the invention. The method illustrated in FIG. 6 will be described in the context of a user interacting with a resource provider. The user may submit a data packet comprising a plurality of data values related to authentication data. For example, the user may be authenticated prior to accessing a secure location. It is understood, however, that the invention can be applied to other types of interactions (i.e., data interactions, payment interactions, secure webpage interactions, and/or the like). Although the steps are illustrated in a specific order, it is understood that embodiments of the invention may include methods that have the steps in different orders. In addition, steps may be omitted or added and may still be within embodiments of the invention.

Prior to step 615, the user device 602 can capture data from the user, as described herein, which the user device 602 can convert into data values. For example, the user device 602 may capture a biometric sample from the user and may convert the biometric sample into a biometric template (i.e., data value). Step 615 may occur when a user initiates an interaction with a resource provider. For example, in some embodiments, the user may utilize a user device 602 to communicate with an access device 604. In some embodiments, the access device 604 can request particular data values from the user device 602.

At step 615, the user device 602 can transmit a data packet to the access device 604. In some embodiments, the user may use a user device 602 such as a credit card to interact with the access device 604. For example, the user may take their credit card and insert it into a slot in the access device 604 or swipe it through a slot in the access device 604. The device reader of the access device 604 can read the data packet from the user device 602. In other embodiments, the user can input the data packet into the access device 604 by using a keyboard or touchscreen. The data packet can comprise a plurality of data values. For example, the data packet can comprise data values including a fingerprint biometric template, a phone number, a username, and a password.

At step 620, after receiving the data packet, the access device 604 can transmit the data packet to the data distribution computer 606. In some embodiments, the access device 604 can generate an authorization request message comprising the data packet and can then transmit the authorization request message to the data distribution computer 606.

At step 625, after receiving the data packet, the data distribution computer 606 can determine a data item for each data value of the plurality of data values. The data distribution computer 606 can analyze characteristics of the data value to determine the data item of the data value. For example, the data distribution computer 606 can determine that a data value is of the data item phone number based on, for example, the length of the data value (e.g., 10 digits), the frequency of receiving phone numbers from the particular access device 604 (e.g., 60%, 85%, etc.), and/or any other suitable characteristics, as described herein.

At step 630, the data distribution computer 606 can then associate each data value to a processing computer using the data item of each data value. The data distribution computer 606 can determine a processing computer associated with a particular data item in a lookup table or database, described herein. For example, the data distribution computer 606 can determine that the data value of the fingerprint biometric template is associated with a first processing computer, that the data value of the phone number is associated with a second processing computer, and that the data values of the username and the password are both associated with a third processing computer.

At step 635, after associating each data value to a processing computer, the data distribution computer 606 can generate a plurality of authorization request messages, as described herein, comprising at least one data value. At steps 640, 645, and 650, the data distribution computer 606 can transmit the plurality of authorization request messages to the plurality of processing computers 608. For example, the data distribution computer 606 can transmit one authorization request message to each of the processing computers associated with the data values.

At steps 655, 660, and 665, after respectively receiving the plurality of authorization request messages, each processing computer of the plurality of processing computers 608 can process the authorization request messages. For example, the first processing computer of the plurality of processing computers 608 can receive an authorization request message comprising the data value of the user's fingerprint biometric template. Each processing computer of the plurality of processing computers can determine a result after processing the data values in the respective authorization request messages.

The first processing computer can determine whether or not the biometric template matches a previously stored biometric template associated with the user. The first processing computer can determine, for example, a match score which indicates the similarity of the two biometric templates. The first processing computer can output a result. In this case, the match score can be the result of the first processing computer.

The second processing computer of the plurality of processing computers 608 can receive an authorization request message comprising the data value of the user's phone number. The second processing computer can perform any suitable authentication process with the user's phone number. The second processing computer, for example, can transmit code as well as a link to a website to the phone associated with the received phone number. For example, the code and the link can be transmitted via SMS, or any other suitable communication channel. In some embodiments, the phone may be the user device 602. Upon receiving the code and the link to the website, the user can activate the link (e.g., click on the link) which may direct a web browser on the phone to navigate to a particular website operated by the second processing computer. The user can input the code into a data field on the webpage in order to verify that the user is in possession of the phone number. The second processing computer can then determine whether or not the received code matches the transmitted code. The second processing computer can output, as a result, an indication of whether or not the user was authenticated via the phone number.

The third processing computer of the plurality of processing computers 608 can receive an authorization request message comprising the data value of the user's username and the data value of the user's password. The third processing computer can determine if the username and password match a previously stored username and password. The third processing computer can output, as a result, an indication of whether or not the username and the password are correct (i.e., "yes" or "no").

At steps 670, 675, and 680, each processing computer of the plurality of processing computers 608 can forward the plurality of authorization request messages to the authorization computer 610. In some embodiments, each processing computer may process the plurality of authorization request messages in different lengths of time. Each processing computer may forward the authorization request message at a different time, to the authorization computer 610.

In some embodiments, a processing computer may insert the result in the authorization request message. For example, if the first processing computer determines that the biometric template does not match the stored biometric template, then the result may be a match score of 0. The first processing computer can insert the result into the authorization request message such that the authorization computer 610 can utilize the information that the biometric templates did not match.

In other embodiments, the processing computer may not insert the result in the authorization request message unless there was a predetermined issue with the result, such as a match score indicating that the biometric templates do not match. For example, the first processing computer can determine that the biometric template does match the stored biometric template. The first processing computer can then determine to not insert the result in the authorization request message as the first processing computer may not need to notify the authorization computer 610 of a match.

At step 685, after receiving the plurality of authorization request messages, the authorization computer 610 can determine if the interaction can be authorized. The authorization computer 610 can determine whether or not each of the authorization request messages can be authorized. In some embodiments, the authorization computer 610 can run any appropriate fraud checks on the interaction, and may evaluate whether or not the user conducting the interaction has sufficient funds and/or credit in their account. If the user does, the interaction can be approved. In some embodiments, the authorization computer 610 can comprise a plurality of authorization rules that can be used to determine whether an authorization request is valid or not.

In some embodiments, the authorization computer 610 can include dynamic rules that may determine which user account to associate with an authorization request message based on the data items in the authorization request message. For example, a dynamic rule may include a rule that data items of a data type of biometric template can be associated with a user's authentication account. As yet another example, a dynamic rule may be to apply a data item representing a request to access the user's employer's location to a user's account that may have been set up by the employer. The authorization computer 610 can determine a user account associated with each authorization request message based on the at least one data item included in the authorization request message.

As another example, the steps in FIG. 6 may be performed with other data values and data items. For example, step 615 may occur when a user initiates an interaction with a resource provider. The interaction between the user and the resource provider may be a transaction. The user can select which data values to purchase.

At step 615, the user device 602 can transmit a data packet to the access device 604. The data packet can comprise a plurality of data values. For example, the data packet can comprise data values including "APPL04," "ORNG01," and "TV02," which can correspond to data items of "grocery SKU," "grocery SKU," and "electronics SKU," respectively. For example, the user may be attempting to purchase a Fuji apple, a navel orange, and a 40 inch LCD television.

At step 620, after receiving the data packet, the access device 604 can transmit the data packet to the data distribution computer 606. At step 625, after receiving the data packet, the data distribution computer 606 can determine a data item for each data value of the plurality of data values. For example, the data distribution computer 606 can store a lookup table associating data values with data items. The data distribution computer 606 can determine that the data value "APPL04" is associated with a data item of "grocery SKU" in the lookup table. Similarly, the data distribution computer 606 can determine that the data value "ORNG01" is associated with a data item of "grocery SKU" in the lookup table and can determine that the data value "TV02" is associated with a data item of "electronics SKU."

At step 630, the data distribution computer 606 can then associate each data value to a processing computer using the data item of each data value. The data distribution computer 606 can determine a processing computer associated with a particular data item in a lookup table or database, described herein. For example, the data distribution computer 606 can determine that both of the data values of the grocery SKU are associated with a first processing computer and that the data value of the electronics SKU is associated with a second processing computer.

At step 635, after associating each data value to a processing computer, the data distribution computer 606 can generate a plurality of authorization request messages, as described herein, comprising at least one data value. At steps 640 and 645, the data distribution computer 606 can transmit the plurality of authorization request messages to the plurality of processing computers 608. For example, the data distribution computer 606 can transmit one authorization request message to each of the processing computers associated with the data values. Note, in this example, that there are two processing computers rather than three, therefore step 650 may not occur.

At steps 655 and 660, after respectively receiving the plurality of authorization request messages, each processing computer of the plurality of processing computers 608 can process the authorization request messages. Note, in this example, that there are two processing computers rather than three, therefore step 665 may not occur.

The first processing computer of the plurality of processing computers 608 can receive the authorization request message comprising the data values of "APPL04" and "ORNG01." The first processing computer can determine that a fraud risk of the transaction is low with a high probability. For example, the first processing computer can determine that two data values of the data item of "grocery SKU" will have a low probability of being fraudulently purchased by a malicious party. In some embodiments, the first processing computer can evaluate associated with the data values. For example, the data value of "APPL04" can be associated with an amount of "$1.23," while the data value of "ORNG" is associated with an amount of "$0.86." The first processing computer can determine that the total amount of "$2.09" is less than a predetermined threshold. The predetermined threshold may be, for example, $1000 of groceries, since total amounts of groceries less than $1000 have a low probability of fraud.

The second processing computer of the plurality of processing computers 608 can receive the authorization request message comprising the data value of "TV02." The second processing computer may perform a more stringent fraud analysis than the first processing computer as electronics may have higher rates of being purchased in fraudulent transactions than groceries. The second processing computer can perform any suitable fraud analysis known to one of skill in the art.

At steps 675 and 680, each processing computer of the plurality of processing computers 608 can forward the plurality of authorization request messages to the authorization computer 610. Note, in this example, that there are two processing computers rather than three, therefore step 670 may not occur. At step 685, after receiving the plurality of authorization request messages, the authorization computer 610 can determine if the interaction can be authorized. The authorization computer 610 can determine whether or not each of the authorization request messages can be authorized.

In some embodiments, the authorization computer 610 can include dynamic rules that may determine which user account to associate with an authorization request message based on the data values in the authorization request message. For example, the dynamic rules may include a rule that data values of a data item of electronic SKU of an amount of greater than $1000 to be charged to the user's checking account.

Figure 7:
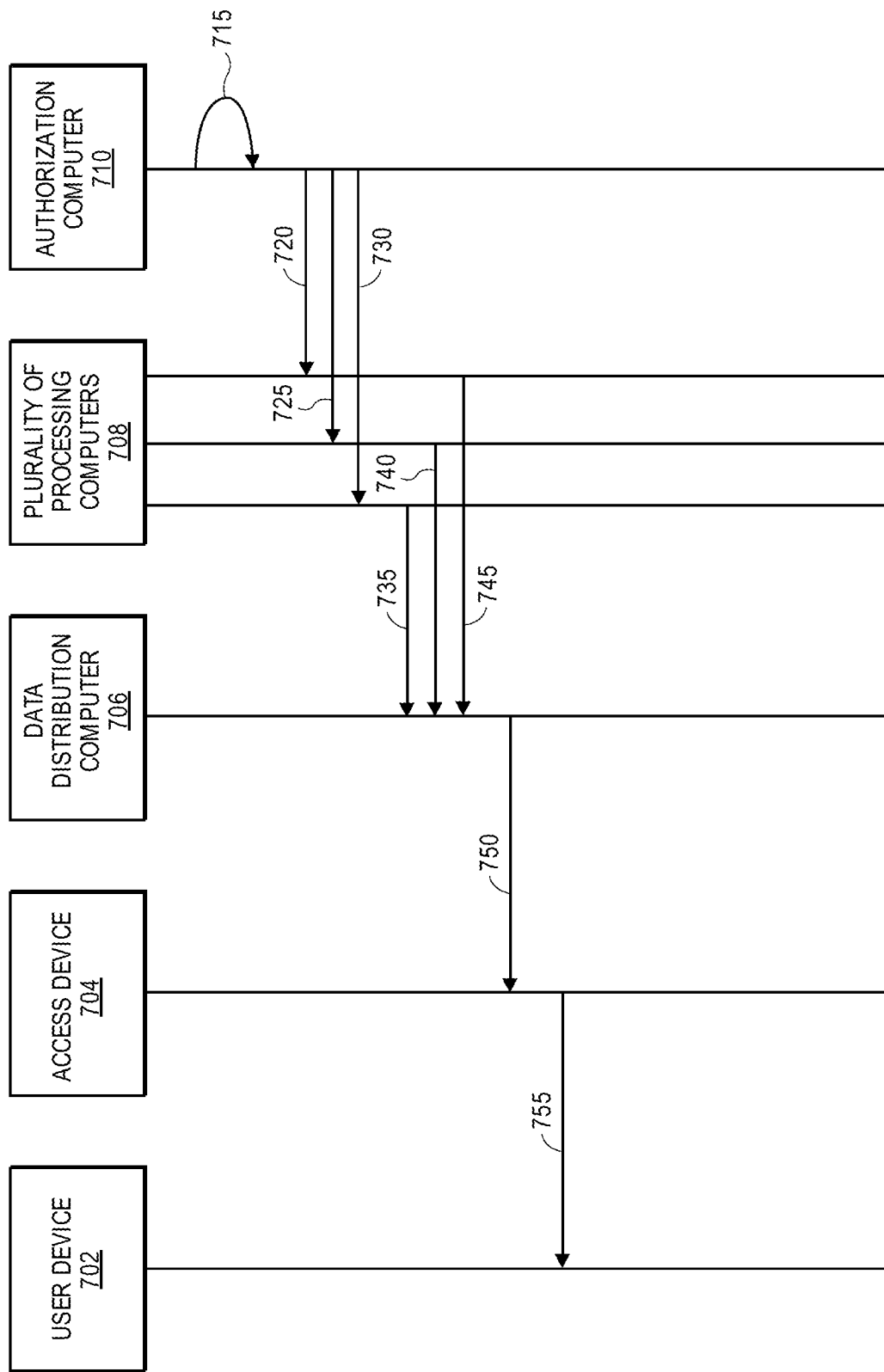
FIG. 7 shows a flowchart illustrating an authorization response message method according to embodiments of the invention.

FIG. 7 shows a flowchart illustrating an authorization response message method according to an embodiment of the invention. The method illustrated in FIG. 7 will be described in the context of a user interacting with a resource provider. The user may submit a data packet comprising a plurality of data values related to authentication data. For example, the user may be authenticated prior to accessing a secure location. It is understood, however, that the invention can be applied to other types of interactions (i.e., data interactions, payment interactions, secure webpage interactions, and/or the like). Although the steps are illustrated in a specific order, it is understood that embodiments of the invention may include methods that have the steps in different orders. In addition, steps may be omitted or added and may still be within embodiments of the invention. Steps 715-755 may occur after steps 615-685 as described in FIG. 6.

At step 715, the authorization computer 710 can generate a plurality of authorization response messages. Each authorization response message may approve or decline the interaction. The authorization computer 710 can generate the plurality of authorization response messages based on the respective analysis of the plurality of authorization request messages. Each authorization response messages can correspond to one of the authorization request messages. In some embodiments, the authorization request message can comprise the data value(s). In other embodiments, the authorization request message can further comprise a data header and/or the result.

At steps 720, 725, and 730, the authorization computer 710 can transmit the plurality of authorization response messages to the plurality of processing computers 708. The authorization computer 710 can transmit the authorization response message to the processing computer that the authorization computer 710 received the authorization request message from. For example, the authorization computer 710 may receive a first authorization request message from a first processing computer as well as a second authorization request message from a second processing computer. The authorization computer 710 can generate two authorization response messages including a first authorization response message and a second authorization response message. The first authorization response message can be the response corresponding to the first authorization request message, whereas the second authorization response message can be the response corresponding to the second authorization request message.

At steps 735, 740, and 745, after receiving the plurality of authorization response messages, respectively, the plurality of processing computers 708 can forward the plurality of authorization response messages, respectively, to the data distribution computer 706. In some embodiments, each of the processing computers can perform any suitable fraud risk analysis on the authorization response messages.

At step 750, after receiving the plurality of authorization response messages the data distribution computer 706 can forward the plurality of authorization response messages to the access device 704. In some embodiments, the data distribution computer 706 may receive each of the authorization response messages at different times. The data distribution computer 706 can forward each of the authorization response messages after receiving and, possibly processing, the authorization response message.

In other embodiments, the data distribution computer 706 can wait until it has received all of the authorization response messages from the plurality of processing computers 708. The data distribution computer 706 can then transmit all of the authorization response messages at, or around, the same time. In yet other embodiments, the data distribution computer 706 can aggregate all of the receive authorization response messages into an authorization response message, then transmit the authorization response message to the access device 704.

At step 755, after receiving the plurality of authorization response messages, the access device 704 can forward the plurality of authorization response messages, or derivatives thereof, to the user device 702. The access device 704 can notify the user to whether or not the interaction was authorized, for example, via a message transmitted to the user device 702.

In some embodiments, the access device 704 can determine whether each authorization response message indicates that the interaction is authorized or declined. In some embodiments, the access device 704 can determine that the interaction as a whole is declined if at least one of the authorization response messages indicates that the interaction is declined. In other embodiments, the access device 704 can determine that part of the interaction is declined if at least one of the authorization response messages indicates "declined" and can determine that part of the interaction is authorized if at least one of the authorization response messages indicates "authorized."

For example, the resource provider may be a merchant at which the user is attempting to purchase groceries as well as a television. If an authorization response message corresponding to data value(s) representing the groceries is authorized, then the access device 704 (or in some embodiments, a resource provider computer) can determine that the user can receive the groceries. If an authorization response message corresponding to the data value representing the television is declined, then the access device 704 can determine that the user is not authorized to receive the television. The resource provider can make the groceries, but not the television, available to the user.

Figure 8:
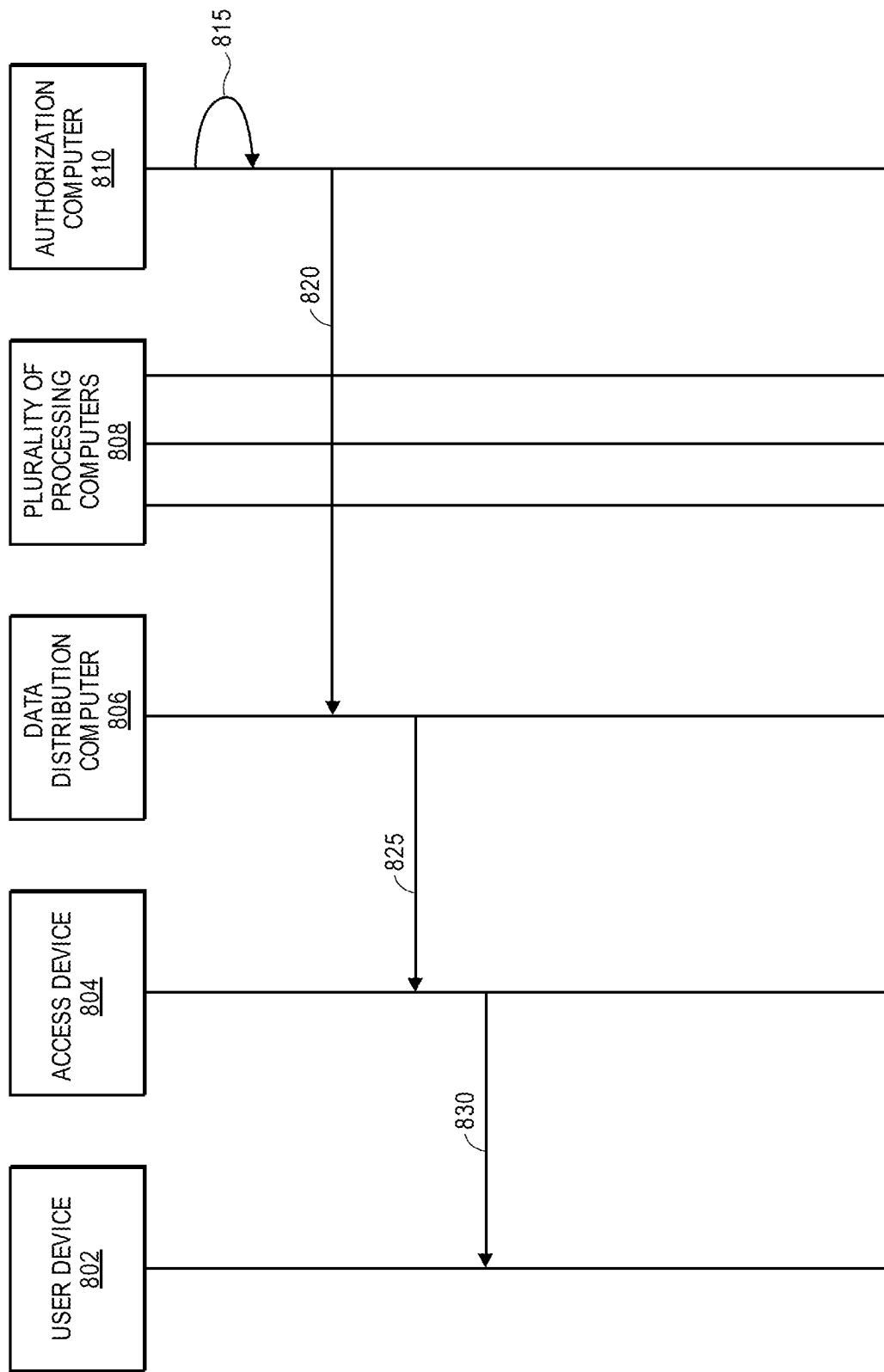
FIG. 8 shows a flowchart illustrating an authorization response message method according to embodiments of the invention.

FIG. 8 shows a flowchart illustrating an authorization response message method according to an embodiment of the invention. The method illustrated in FIG. 8 will be described in the context of a user interacting with a resource provider. The user may submit a data packet comprising a plurality of data values related to authentication data. For example, the user may be authenticated prior to accessing a secure location. It is understood, however, that the invention can be applied to other types of interactions (i.e., data interactions, payment interactions, secure webpage interactions, and/or the like). Although the steps are illustrated in a specific order, it is understood that embodiments of the invention may include methods that have the steps in different orders. In addition, steps may be omitted or added and may still be within embodiments of the invention. Steps 815-830 may occur after steps 615-685 as described in FIG. 6.

At step 815, after analyzing each authorization request message and determining whether or not to authorize the interaction (at step 685), the authorization computer 810 can generate a plurality of authorization request messages, similar to step 715, described above.

At step 820, after generating the plurality of authorization response messages, the authorization computer 810 can transmit the plurality of authorization response messages to the data distribution computer 806. In some embodiments, the authorization computer 810 can transmit the plurality of authorization response messages as the analysis of the corresponding authorization request message is completed. In other embodiments, the authorization computer 810 can transmit the plurality of authorization response messages at, or around, the same time.

At step 825, after receiving the plurality of authorization response messages, the data distribution computer 806 can forward the plurality of authorization response messages to the access device 804.

At step 830, in some embodiments, the access device 804 can forward the plurality of authorization response messages to the user device 802. In other embodiments, the access device 804 can notify the user device 802 of whether or not the interaction between the user and the resource provider was authorized by the authorization computer 810.

In some embodiments, at least one authorization response message (i.e., declined authorization response message) may indicate that the interaction was declined. For example, the data values in the declined authorization response message may include a username and a password. The username and/or password may have been inputted incorrectly by the user, thus leading to the declined interaction. The user can re-input the username and the password into the user device 802.

The user device 802 may transmit a second data packet comprising data values (e.g., the username and the password) associated with the declined authorization response message to the access device 804. The second data packet may be in response to a second interaction between the resource provider and the user. The access device 804 can forward the second data packet to the data distribution computer 806.

After receiving the second data packet, the data distribution computer 806 can determine data items associated with each of the data values in the second data packet. The data distribution computer 806 can then perform any suitable processing of a data packet described herein. For example, the process may be similar to steps 615-685 and 715-755 or 815-830.

The user and the resource provider may only need to perform the second interaction with the data values that are associated with the declined authorization response message(s), rather than all of the data values again. For example, the user may not need to re-input a fingerprint biometric sample since the authorization computer 810 has already authorized the authorization request message associated with the fingerprint biometric template. In other embodiments, the user and resource provider may determine to limit the interaction based on which data values are associated with the authorized authorization response message(s).

In some embodiments, the plurality of data values can be associated with the data item of "product data" (e.g., SKU data). SKU data can be level 1 (L1) SKU data, level 2 (L2) SKU data, or level 3 (L3) SKU data. L1 data may include a transaction amount (i.e., total) and a date. L2 data can include L1 data as well as a tax amount, a customer code (e.g., 30 character string), a merchant postal code, a tax identification code, a merchant minority code, and a merchant state code. L3 data can include L2 data as well as a ship from postal code, destination postal code, an invoice number, an order number, an item product code, an item commodity code, an item description, an item quantity, an item unit of measure, an item extended amount, a freight amount, and a duty amount.

After a data distribution computer receives a data packet comprising the data values from an access device, the data distribution computer can determine the data item associated with the data values is product data. A data item can be a specific type of product data. For example, a data item can be electronics product data, jewelry product data, groceries product data, clothing product data, pet supplies product data, kids toys product data, or any other suitable type of product data. The data distribution computer can then associate each data value with a processing computer (e.g., a network computer). For example, the data distribution computer can send data value(s) that are associated with SKU data of "electronics" to a first processing computer in a first authorization request message. The data distribution computer can further send data value(s) that are associated with SKU data of "groceries" to a second processing computer in a second authorization request message. Each processing computer can forward the authorization request message to an authorization computer. The authorization computer can then analyze each authorization request message to authorize or decline the interaction. The authorization computer can then generate and transmit a plurality of authorization response messages corresponding to the plurality of authorization request messages. to the data distribution computer. The data distribution computer can then forward each of the authorization response messages to the access device.

Embodiments of the invention have a number of advantages. For example, data packets can be split up based on the underlying data values. The data values, extracted from the data packets, can be transmitted to various processing computers in authorization request messages. Each processing computer may have different capabilities for processing the received data value(s). Rather than one processing computer that processes every data value in the data packet, each processing computer can process the received data value(s) in parallel, thus improving the overall computation time.

Furthermore, the security of the data values is improved since the plurality of data values are transmitted to different processing computers. A single data breach at a processing computer may not affect all of the data values. Only the data value(s) received by the compromised processing computer may be compromised.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by an authorization computer, a plurality of authorization request messages from a plurality of processing computers, the plurality of authorization request message associated with an interaction;
   analyzing, by the authorization computer, each authorization request message to authorize or decline the interaction;
   generating, by the authorization computer, one or more authorization response messages based on the respective analysis of the plurality of authorization request messages, wherein each authorization response message corresponds to one of the authorization request messages; and
   transmitting, by the authorization computer, the one or more authorization response messages to one or more of the plurality of processing computers,
   wherein the plurality of processing computers receive the plurality of authorization request messages from a data distribution computer, where the data distribution computer receives a data packet from an access device, the data packet comprising a plurality of data values in response to the interaction, which is between a resource provider and a user, wherein the plurality of processing computers are adapted to process the data values in the respective authorization request messages, wherein the plurality of processing computers process the data values in the respective authorization request messages, and
   wherein the data distribution computer determines a data item for each data value of the plurality of data values, associates each data value to a processing computer in the plurality of processing computers using the data item for each data value, and generates the plurality of authorization request messages, each comprising at least one data value.

2. The method of claim 1, wherein the plurality of processing computers receive the one or more authorization response messages, and transmit the one or more authorization response messages to a distribution computer.

3. The method of claim 1, wherein the one or more authorization response messages comprise a plurality of authorization response messages, which are transmitted to the plurality of the processing computers.

4. The method of claim 1, wherein the authorization computer determines a user account associated with each authorization request message based on at least one data value.

5. The method of claim 4, wherein the interaction is a transaction.

6. The method of claim 1,
wherein the data item includes a biometric template, a phone number, product data, a name, user credentials, a security code, a location access code, a physical address, a location, an IP address, an email address, a user identifier, and/or a device identifier.

7. The method of claim 1, wherein the authorization computer is an issuer computer.

8. The method of claim 1, wherein each authorization response message comprises an indicator which indicates that the corresponding authorization request message is approved.

9. The method of claim 1, wherein each authorization response message of the one or more authorization response messages comprises a data header.

10. The method of claim 1, wherein each authorization request message comprises an amount.

11. The method of claim 1, wherein each authorization request message comprises a token or a primary account number.

12. The method of claim 1, wherein each authorization request message comprises a primary account number.

13. A system comprising:
a plurality of processing computers; and
an authorization computer in communication with the plurality of processing computers, the authorization computer comprising,
a processor, and
a computer readable medium, the computer readable medium comprising code, executable by the processor for performing a method comprising,
receiving, by the authorization computer, a plurality of authorization request messages from the plurality of processing computers, the plurality of authorization request message associated with an interaction,
analyzing, by the authorization computer, each authorization request message to authorize or decline the interaction,
generating, by the authorization computer, one or more authorization response messages based on the respective analysis of the plurality of authorization request messages, wherein each authorization response message corresponds to one of the authorization request messages, and
transmitting, by the authorization computer, the one or more authorization response messages to one or more of the plurality of processing computers,
wherein the plurality of processing computers are programmed to receive the plurality of authorization request messages from a data distribution computer, where the data distribution computer receives a data packet from an access device, the data packet comprising a plurality of data values in response to the interaction, which is between a resource provider and a user, wherein the plurality of processing computers are adapted to process the data values in the respective authorization request messages, wherein the plurality of processing computers are programmed to process the data values in the respective authorization request messages, and
wherein the data distribution computer is programmed to determine a data item for each data value of the plurality of data values, associates each data value to a processing computer in the plurality of processing computers using the data item for each data value, and generates the plurality of authorization request messages, each comprising at least one data value.

14. The system of claim 13, the plurality of processing computers are further programmed to receive the one or more authorization response messages, and transmit the one or more authorization response messages to a distribution computer.

15. The system of claim 13, wherein the authorization computer is an issuer computer.

16. The system of claim 13, wherein each authorization request message comprises an amount.

17. The system of claim 13, wherein each authorization request message comprises a primary account number.

18. The system of claim 13, wherein each authorization request message comprises a primary account number or a token.

19. The system of claim 13, wherein the interaction is a payment transaction.

* * * * *